United States Patent [19]
Sørensen

[11] Patent Number: 5,952,932
[45] Date of Patent: Sep. 14, 1999

[54] COMMUNICATION BETWEEN MASTER UNIT AND SLAVE UNIT WITH EFFICIENT PROTOCOL

[75] Inventor: Bent Sørensen, Billund, Denmark

[73] Assignee: Interlego AG, Baar, Switzerland

[21] Appl. No.: 08/987,154

[22] Filed: Dec. 8, 1997

[51] Int. Cl.[6] ....................................................... H04J 3/24
[52] U.S. Cl. ................... 340/825.07; 370/470; 370/471; 370/473; 370/522; 370/523; 370/527; 395/200.38; 395/200.6; 395/200.57; 395/200.67; 375/358
[58] Field of Search ................. 340/825.07; 395/200.38, 395/200.6, 200.57, 200.67; 370/470, 471, 473, 522, 523, 527, 280; 375/358

[56] References Cited

U.S. PATENT DOCUMENTS 5,530,436   6/1996   Tabib et al. ......................... 340/825.07
5,740,199   4/1998   Sibigtroth ............................... 370/280
5,828,318  10/1998   Cesar ................................. 340/825.05

*Primary Examiner*—Brian Zimmerman
*Assistant Examiner*—Yves Dalencourt
*Attorney, Agent, or Firm*—Finnegan, Henderson, Farabow, Garrett & Dunner, L.L.P.

[57] ABSTRACT

A method of communication between a master unit and a slave unit, including the steps of: sending at least a command byte from the master unit to the slave unit including data byte counter bits to be interpreted by the slave unit according to the following rule set; if said data byte counter bits belong to a first set, then said data byte counter bits contain information representing a number of associated data bytes, which is the expected number of data bytes; if said data byte counter bits belong to a second set, then said data byte counter bits contain information representing a number which must be decoded before the expected number of data bytes is obtained; receiving at least the command byte; interpreting the command byte; and receiving the number of data bytes required by the rule set.

55 Claims, 5 Drawing Sheets

COMMUNICATION BETWEEN MASTER UNIT AND SLAVE UNIT WITH EFFICIENT PROTOCOL

FIELD OF THE INVENTION

The present invention relates to the field of communication between a master unit and a slave unit, said slave unit being capable of executing a set of instructions downloaded from the master unit, in order to control some type of construction e.g. a semi-autonomous car.

BACKGROUND OF THE INVENTION

The recent technological development in semiconductor devices, has made small and low-cost microprocessors, e.g. single chip processors, an attractive component in control and data acquisition systems. In the early days of computer-controlled control systems a central computer managed all the computations and input/output operations in the system. But the new processors have made it possible and feasible to distribute the computations and input/output operations to smaller local computers (slave units), which are configured and/or monitored from a central computer (master unit). This approach frees the control-related computational effort in the central computer, which can instead be used for e.g. a better user interface. However, in order to obtain a feasible solution efficient and reliable communication between the master unit and the slave unit is required.

The communications between the master unit and the slave unit typically comprise instructions (commands) associated with a set of parameters (data). Typically a computer program is downloaded from the master unit to the slave unit, which—after the download—will run the program. However, it may be required to down load additional information from the master unit to the slave unit while the down-loaded program is executed in the slave unit. Further, in order to obtain a cost efficient solution, single chip processors with a small memory and a very limited number of additional components are preferred. Therefore, it is important that the effort associated with the communications in the slave unit occupies as little memory and processor time as possible. Another and important aspect of the communications is that they have to be reliable. If a command to the slave unit is lost, it can be fatal to the function of the control system in question.

U.S. Pat. No. 5,530,436 discloses a method of communication between a master unit and a slave unit, wherein a control byte comprising an expansion bit is transmitted with a succeeding first address byte. If an additional second address byte is required, then an expansion bit is set and the additional second address byte succeeds the first address byte. This is convenient if it is most likely that only the first address byte is needed. Although this is an efficient coding of addresses, it does not take into account that commands and associated data also need an efficient coding, neither does this coding scheme incorporate a reliability handling procedure.

SUMMARY OF THE INVENTION

An object of the invention is to provide a method which provides an efficient and flexible protocol. Especially when a large set of small messages has to be communicated.

This is achieved according to the invention by a method of communication between a master unit and a slave unit, comprising the steps of: sending at least a command byte from the master unit to the slave unit comprising data byte counter bits to be interpreted by the slave unit according to the following rule set; if said data byte counter bits belong to a first set, then said data byte counter bits contain information representing a number of associated data bytes, which is the expected number of data bytes; if said data byte counter bits belong to a second set, then said data byte counter bits contain information representing a number which must be decoded before the expected number of data bytes is obtained; receiving at least the command byte; interpreting the command byte; and receiving the number of data bytes required by the rule set.

Consequently, it is possible to transmit and receive messages in a slave unit and a master unit, such that efficient communication of a set of messages comprising a relatively large number of short messages is obtained, it being possible to have long messages. Or such that efficient communication of a set of messages comprising a relatively large number of long messages is obtained, it being possible to have short messages.

The command byte may further comprise a message counter, which is increased each time a new message is sent, but remains unchanged during retransmissions. Hereby, a more reliable communication scheme is obtained.

According to the invention, a further object of the invention is to provide a method wherein information is received in e.g. a slave unit. The method comprises the steps of receiving a command byte comprising data byte counter bits, and receiving data bytes according to the following rule set: if the data byte counter bits belong to a first set, then the data byte counter bits contain information representing a number of associated data bytes which is the expected number of data bytes; if the data byte counter bits belong to a second set, then the data byte counter bits contain information representing a number which must be decoded before the expected number of data bytes is obtained.

Consequently, it is possible to receive messages in a slave unit or a master unit, such that efficient communication of a set of messages comprising a relatively large number of short messages is obtained, it being possible to have long messages. Or such that efficient communication of a set of messages comprising a relatively large number of long messages is obtained, it being possible to have short messages.

Still according to the invention, a further object of the invention is to provide a method wherein information is transmitted from e.g. a master unit, comprising the steps of: sending at least a command byte, comprising command bits and data byte counter bits; sending a number of data bytes, according to the following rule set; if the data byte counter bits belong to a first set, then the data byte counter bits contain information representing a number of associated data bytes, which is the number of data bytes to be sent; if the data byte counter bits belong to a second set, then the data byte counter bits contain information representing a number which must be encoded before the number of data bytes to be sent is obtained.

Consequently, it is possible to transmit messages in a slave unit or a master unit, such that efficient communication of a set of messages comprising a relatively large number of short messages is obtained, it being possible to have long messages. Or such that efficient communication of a set of messages comprising a relatively large number of long messages is obtained, it being possible to have short messages.

The invention also relates to a computer readable memory device encoded with a data structure for transferring information between a master program and a slave program, the information comprising at least a command byte associated with a number of data bytes, the master program comprising a counter having a data structure with at least one parameter containing information on the number of associated data bytes, said parameter being modified according to the following rule: if the command byte belongs to a first set of commands, then the command byte contains a value representing the number of associated data bytes and the parameter is modified with that value; if the command byte belongs to a second set of commands, then the parameter is modified with a reduced value.

According to the invention a further object of the invention is to provide a computer readable memory device encoded with a data structure for receiving information in a slave program, the information comprising at least a command byte associated with a number of data bytes, the slave program comprising a counter having a data structure with at least one parameter containing information on the number of associated data bytes, the parameter being modified according to the following rule: if said command byte belongs to a first set of commands, then the command byte contains a value representing the number of associated data bytes and said parameter is modified with that value; if said command byte belongs to a second set of commands, then said parameter is modified with a reduced value.

According to the invention still another object of the invention is to provide a computer readable memory device encoded with a data structure for transmitting information in a master program, the information comprising at least a command byte associated with a number of data bytes, the master program comprising a data structure with at least one parameter containing information on the number of associated data bytes to be transmitted, said parameter being modified according to the following rule: if said command byte belongs to a first set of commands, then the command byte contains a first value representing the number of associated data bytes and the parameter is modified with that value; if said command byte belongs to a second set of commands, then said parameter is modified with a value which is different from said first value.

The invention also relates to a computer system for communication between a master unit and a slave unit comprising: means for sending a command byte comprising data byte counter bits and means for sending data bytes according to a rule set, which implies that if the data byte counter bits belong to a first set, then the data byte counter bits contain information representing a number of associated data bytes which is the expected number of data bytes, and if the data byte counter bits belong to a second set, then the data byte counter bits contain information representing a number which must be decoded before the expected number of data bytes is obtained. The system further comprises means for receiving at least the command byte, means for interpreting the command byte, and means for receiving the number of data bytes required by the rule set.

The invention further relates to a computer system for receiving information in a slave unit comprising means for receiving a command byte comprising data byte counter bits, and means for receiving data bytes according to the following rule set: if the data byte counter bits belong to a first set, then the data byte counter bits contain information representing a number of associated data bytes which is the expected number of data bytes; if the data byte counter bits belong to a second set, then the data byte counter bits contain information representing a number which must be decoded before the expected number of data bytes is obtained.

Still according to the invention, a further object of the invention is to provide a computer system for sending information from e.g. a master unit, which comprises means for sending at least a command byte comprising command bits and data byte counter bits, and means for sending a number of data bytes, according to the following rule set: if the data byte counter bits belong to a first set, then the data byte counter bits contain information representing a number of associated data bytes which is the number of data bytes to be sent; if the data byte counter bits belong to a second set, then the data byte counter bits contain information representing a number which must be encoded before the number of data bytes to be sent is obtained.

DETAILED DESCRIPTION OF PREFERRED EMBODIMENTS

Figure 1:
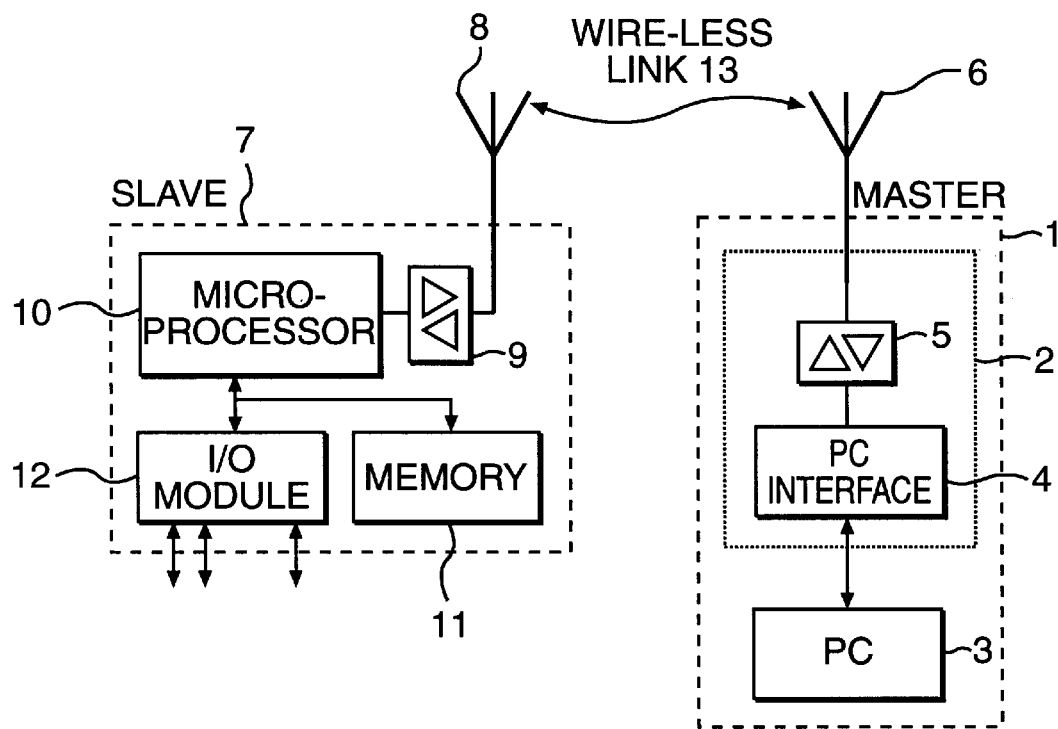
FIG. 1 shows a preferred embodiment of the present invention having a slave transceiver unit and a master transceiver unit.

FIG. 1 shows a preferred embodiment of the present invention having a slave unit and a master unit. The master unit 1 comprises a transceiver (transmitter and receiver) 2 and a personal computer 3, PC. The terms personal computer and PC comprise any type of computers e.g. embedded computers and general purpose computers. The PC 3 is connected by wire to the transceiver 2, using a common PC interface, e.g. a serial RS332 port or an 8-bit parallel port. The transceiver 2 is responsible for communication with a slave unit 7 over the wire-less link 13. The transceiver 2 comprises a PC interface 4 which operates according to the selected PC interface. The transceiver 2 further comprises a two-way repeater and modulator/demodulator 5, which converts signals from the PC interface to signals adapted for a wire-less transmitter and receiver device 6, and visa versa. The wire-less communication may be implemented by means of e.g. RF transmission, ultrasound, or infrared light.

The slave unit 7 like the transceiver 2, has a two-way repeater and modulator/demodulator 9 and a transmitter and receiver device 8. The microprocessor 10 is thereby able to communicate with the master unit 1. The microprocessor is connected to a memory 11 and an input/output module 12, I/O module. The I/O module comprises drivers for e.g. electrical motors, light emitting diodes (LED's), and appropriate interfaces to sensors e.g. switches, photodiodes, etc. The I/O module is configured such that it is possible to control a system. The system may e.g. be a toy train which has a motor for driving the train and sensors/actuators for starting and stopping the train either manually or automatically.

The master unit 1 transmits information to be interpreted by the microprocessor 10. The information e.g. in the form of instructions and associated data may be bundled to constitute a computer program which can be executed by the microprocessor 10. In a preferred embodiment the slave unit 7 receives a software program comprising commands and data which can be executed, while the slave unit 7 receives more commands/data which are provided as additional input to the software program. In this way a control program may be downloaded from the master unit 1, and the software may be able to respond to sensor signals as well as to user commands from the PC 3.

In the same way the slave unit may be able to transmit information to the master unit either as simple acknowledge information or e.g. as sensor initiated commands/requests to the PC 3.

The system shown in FIG. 1 is an example of a system with a relatively low bandwidth wire-less link and a slave unit, the smallest possible hardware being preferred. Thereby, in at least its first aspect, the present invention is primarily directed to communication between the master 1 and the slave 7 over the wire-less link 13.

Information is communicated over the wire-less link 13 in the following byte format:

| CMD | $\overline{\text{CMD}}$ | $\text{DATA}_1$ | $\overline{\text{DATA}}_1$ | ... | $\text{DATA}_N$ | $\overline{\text{DATA}}_N$ | CHK | $\overline{\text{CHK}}$ | where CMD is a command byte, $\text{DATA}_1$ to $\text{DATA}_N$ is data bytes associated with the command byte and CHK is a check sum. The check sum is calculated as an 8-bit truncated addition of the command byte (CMD) and the succeeding data bytes ($\text{DATA}_1 \ldots \text{DATA}_N$). The bar indicates the byte complement, but these bytes are not included in the check sum. N is the number of data bytes that succeeds a specific command. This format is used whenever a command is transmitted. The purpose of sending the byte complement is to obtain a DC free signal to the transceiver. Further, most single chip microprocessors are byte-oriented, thereby making this byte format feasible.

A practical implementation of the present invention may comprise a combination of hardware and software. The physical interface between the master unit 1 and slave unit 7 may of course comprise some type of hardware which is capable of converting logic data signals into physical signals and vice versa. However, the invention may be implemented in hardware, software, or a combination thereof. The software may be embodied in a program which may be executed in any of the hardware devices capable of doing so, e.g. the micro-processor/memory 10/11, the PC interface 4 or the computer PC 3.

Figure 2:
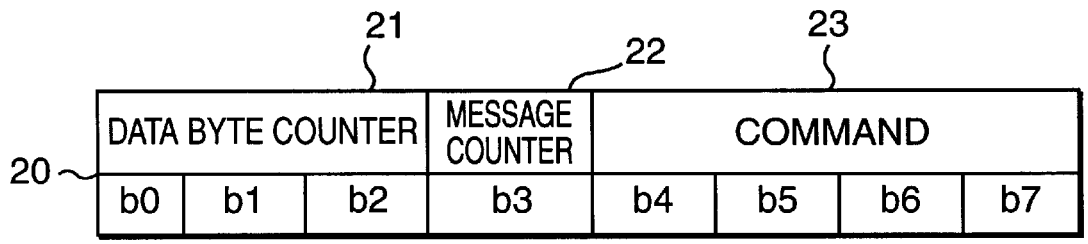
FIG. 2 shows a preferred bit allocation in a command byte according to the invention.

FIG. 2 shows a preferred bit allocation in a command byte according to the invention. The command byte 20 has 8 bits, b0–b7. The data byte counter 21 comprises three bits, b0–b2 and indicates the number N of data bytes succeeding the command byte. The command 23 comprises four bits, b4–b7. The message counter 22 comprises one bit, b3.

This allocation traditionally allows 16 different commands coded by b4, b5, b6, and b7, each command having from 0 to 7 data bytes coded by b0, b1, and b2.

If the number of data bytes is combined with the number of commands, then 128 different combinations are obtained, with an implicit grouping of the commands, such that 8 groups of 16 commands have from 0 to 7 data bytes respectively. To be efficient, this 7-bit straight forward coding of the 128 combinations requires that a command set using this coding scheme fits this grouping of the commands and the associated number of data bytes.

If this implicit associated number of data bytes is skipped to avoid the grouping of commands, e.g. if more than 16 commands use 1 data byte, each 7-bit commmand must be associated with a respective fixed number of data bytes. However, this will increase the complexity of the decoding circuit/software. In particular when the decoding is executed in a byte-oriented microprocessor, it will be necessary to have a look-up table to indicate the number of data bytes associated with a specific 7-bit command. On the other hand, if the number of possible data bytes is fixed and equal for all of the commands a simple decoding circuit can be used, but this scheme will not be efficient, regarding communication bandwidth, if a small number of commands having a relatively large number of data bytes must be supported.

Figure 3:
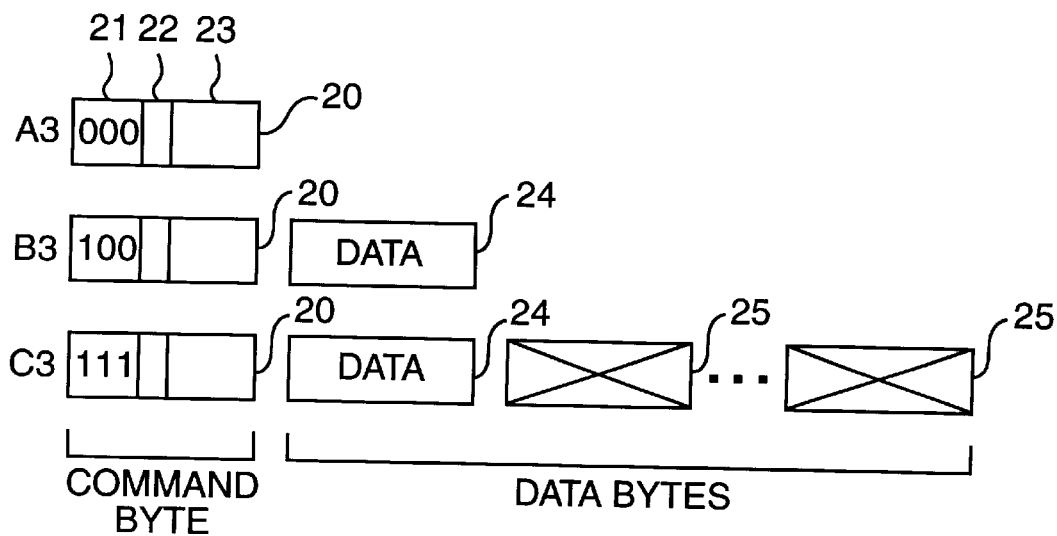
FIG. 3 shows three examples of command bytes and the associated number of data bytes according to the invention.

FIG. 3 shows three examples of command bytes and the associated number of data bytes according to the invention. The examples A3, B3, and C3 each comprise a command byte 20, the command byte further comprising a data byte counter 21, a message counter 22, and a command 23. The data bytes 24 are the expected data bytes, whereas the bytes 25 are bytes that are not sent or expected.

Example A3 shows a command byte where the data byte counter 21 with the binary value "000" indicates that no data bytes are expected.

Example B3 shows a command byte where the data byte counter 21 with the binary value "100" indicates that one data byte is expected.

Example C3 shows a command byte where the data byte counter 21 with the binary value "111" indicates that seven data bytes are expected. However, according to the invention it is possible to configure this group of commands such that only one data byte is expected. This option provides a more efficient coding scheme if a relatively large number of commands uses a small number of data bytes.

Figure 4:
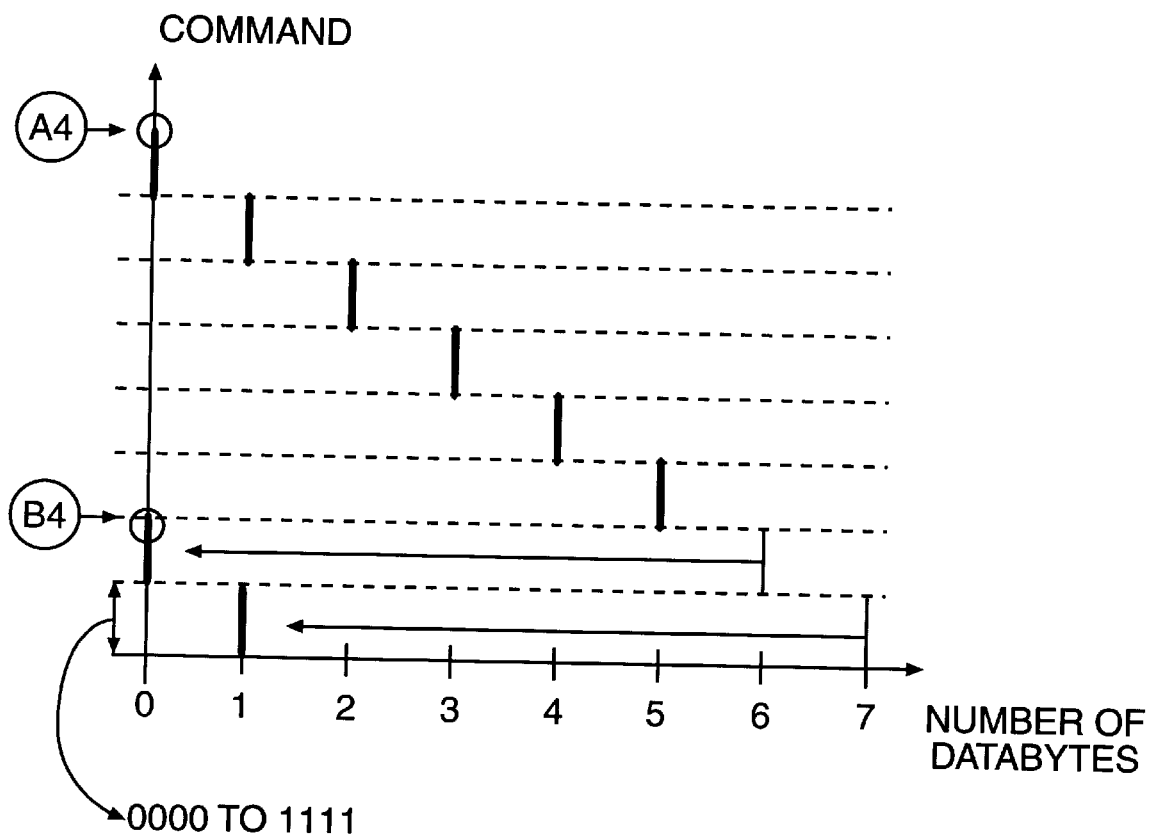
FIG. 4 shows a distribution of commands as a function of possible commands and number of data bytes.

FIG. 4 shows a distribution of commands as a function of possible commands and number of data bytes. The 4-bit command space represented by b4–b7 is repeated 8 times along the command axis. A vertical bold bar represents a span of 16 commands. For a number of applications 6 and 7 data bytes are not needed, and therefore these two groups are respectively moved to the groups having 0 and 1 data bytes. For example the specific command (A4) is coded with the command b4=1, b5=1, b6=1, b7=1, having 0 data bytes: b0=0 (LSB), b1=0, b2=0 (MSB), where LSB is the least significant bit and MSB is the most significant bit. However, the specific command (B4) is coded with the command b4=1, b5=1, b6=1, b7=1, having 6 data bytes: b0=0 (LSB), b1=1, b2=1 (MSB). But the command (B) is interpreted as having no data bytes. With this scheme it is possible to configure a selectable set of commands having a number of data bytes different from that indicated by the data byte counter, e.g. 1, 2, or 17 data bytes, while another set has the number of data bytes indicated by the data byte counter, e.g. 1, 2, 3, 4, or 5 databytes. LSB and MSB may be transmitted in reverse order, if convenient.

Figure 5:
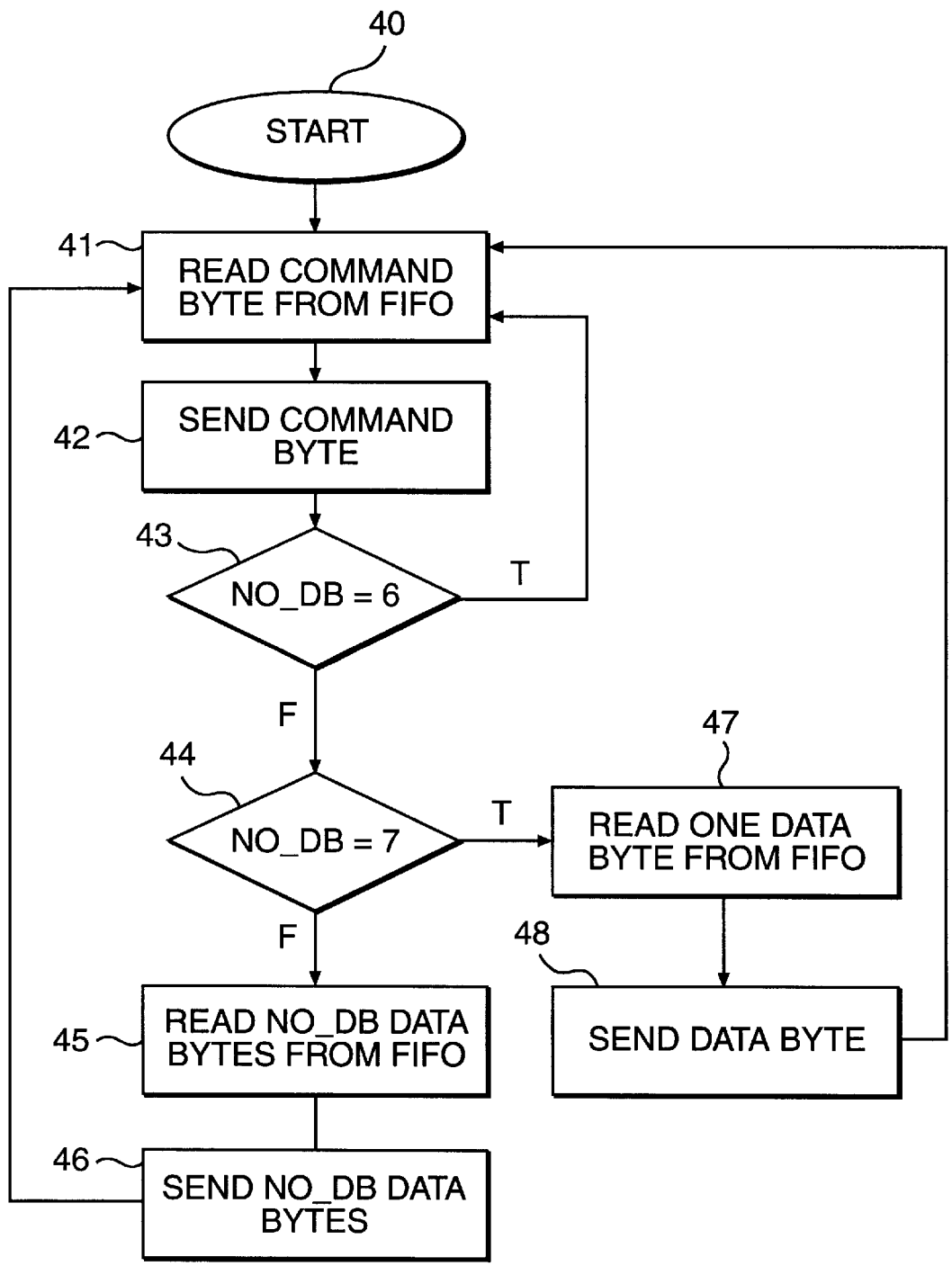
FIG. 5 shows a flow chart for transmitting commands according to the distribution shown in FIG. 4.

FIG. 5 shows a flow chart for transmitting commands according to the distribution shown in FIG. 4. In a preferred embodiment the master unit shown in FIG. 1 will enable a transmission procedure through the start state 40. The procedure may e.g. read the information to be transmitted from a first-in-first-out, FIFO, register in which a sequential list of command bytes and data bytes is stored. The state 41 reads a command byte from the FIFO register, and the state 42 sends the command byte. In the state 43 it is tested whether the number of data bytes, NoDB, indicated by the data byte counter 21 (FIG. 2) is equal to the value "6". If this is true, then no data bytes are associated with that command, and the procedure stops. In the state 44 it is tested whether the number of data bytes, NoDB, indicated by the data byte counter 21 (FIG. 2) is equal to the value "7". If this is true, then the state 47 reads one data byte from the FIFO register, and the state 48 sends the data byte. If NoDB is equal to one of the values "0", "1", "2", "3", "4", or "5", then NoDB data bytes are read from the FIFO in the state 45 and sent by the state 46.

The flow chart in FIG. 5 may be implemented in hardware, software, or a combination thereof. The software implementing the flow chart in FIG. 5 or a part thereof is called the master software. The master software may be embodied in a program which may be executed in any of the hardware devices mentioned above, i.e. the master unit and/or the slave unit.

The software may be distributed by means of any data storage or data transmission medium. The medium comprises floppy discs, CD-ROM, mini disc, compact disc or a network. The network may e.g. be the Internet. Via the network a software embodiment of the invention may be distributed by downloading a computer program. The software may comprise the master software alone.

Figure 6:
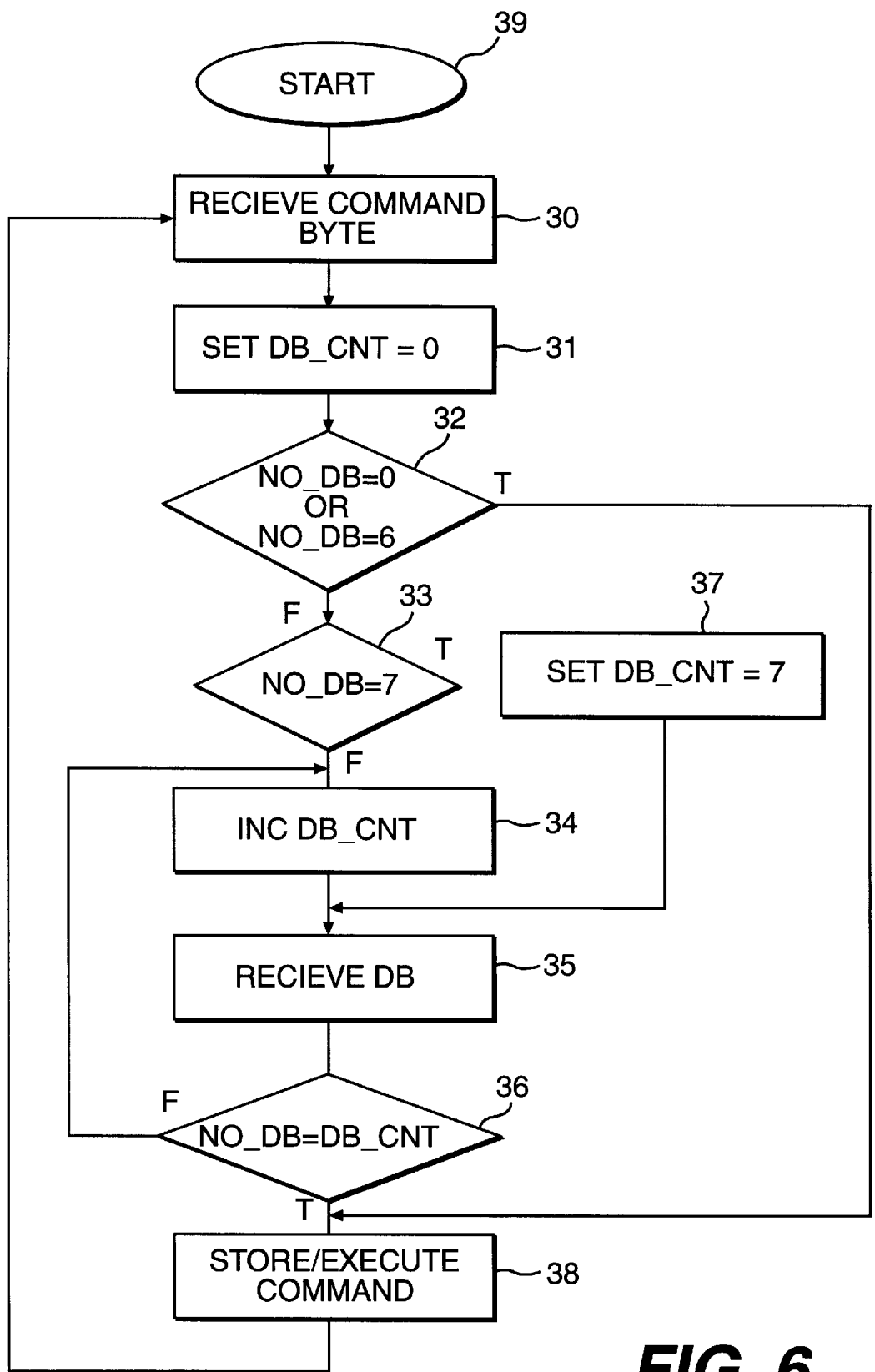
FIG. 6 shows a flow chart for receiving commands according to the distribution shown in FIG. 4.

FIG. 6 shows a flow chart for receiving commands according to the distribution shown in FIG. 4. In a preferred embodiment the slave unit shown in FIG. 1 will be in a receiving mode, waiting to receive a command byte 20 (FIG. 2), unless the receiver replies to a transmitter with an acknowledge signal. The acknowledge signal is preferably the received signal:

| CMD | $\overline{\text{CMD}}$ | $\text{DATA}_1$ | $\overline{\text{DATA}}_1$ | ... | $\text{DATA}_N$ | $\overline{\text{DATA}}_N$ | CHK | $\overline{\text{CHK}}$ |
|---|---|---|---|---|---|---|---|---| or a signal complementary to that. The acknowledge signal can be transmitted or returned when the whole byte sequence is received.

The slave unit 7 is initiated in the state start 39. When e.g. the slave unit 7 (FIG. 1) is in the receiving mode, the state 30 will wait for a command byte and read the contents, i.e. the data byte counter field, NoDB, and the command field, CMD, of that byte. When the command byte is received, the next state 31 will initialize the data byte counter to the value "0". The state 32 looks for command bytes with no succeeding data bytes, that is if the number of data bytes, No DB, read from the command byte is equal to "0" or "6". If the result of the state 32 is true, the command byte will be stored/executed in the state 38.

If the result of the state 32 is false, it will be checked if the number data bytes, NoDB, is equal to "7", that is only one data byte is expected after the command byte. If NoDB is equal to "7", then one data byte is expected and the data byte counter will be set to "7" in the state 37. The expected data byte will be read in the state 35 and stored/executed in the state 38.

If the number of data bytes read in the command byte is equal to "1", "2", "3", "4", or "5", the result of state 33 is false and a loop comprising the states 34, 35, and 36 will be entered, and the loop will run until the number of data bytes is equal to the data byte counter. Every time the loop is run through the data byte counter, DBCNT, is increased. When all data bytes belonging to a given command byte have been retrieved, the receiver will wait for a new command byte. With this approach it is possible to decode the distribution of commands shown in FIG. 4.

Another aspect of the invention is the single bit message counter 22 shown in FIG. 2 as bit b3, which is used to obtain a more robust information communication.

The flow chart in FIG. 6 may be implemented in hardware, software, or a combination thereof. The software implementing the flow chart in FIG. 6 or a part thereof is called the slave software. The slave software may be embodied in a program which may be executed in any of the hardware devices mentioned above, i.e. the master unit and/or the slave unit.

The software may be distributed by means of any data storage or data transmission medium. The medium comprises floppy discs, CD-ROM, mini disc, compact disc or a network. The network may e.g. be the Internet. Via the network a software embodiment of the invention may be distributed by downloading a computer program. The software may comprise the slave software alone.

Likewise, the master and slave software may be distributed in a single software package, as mentioned above.

Figure 7:
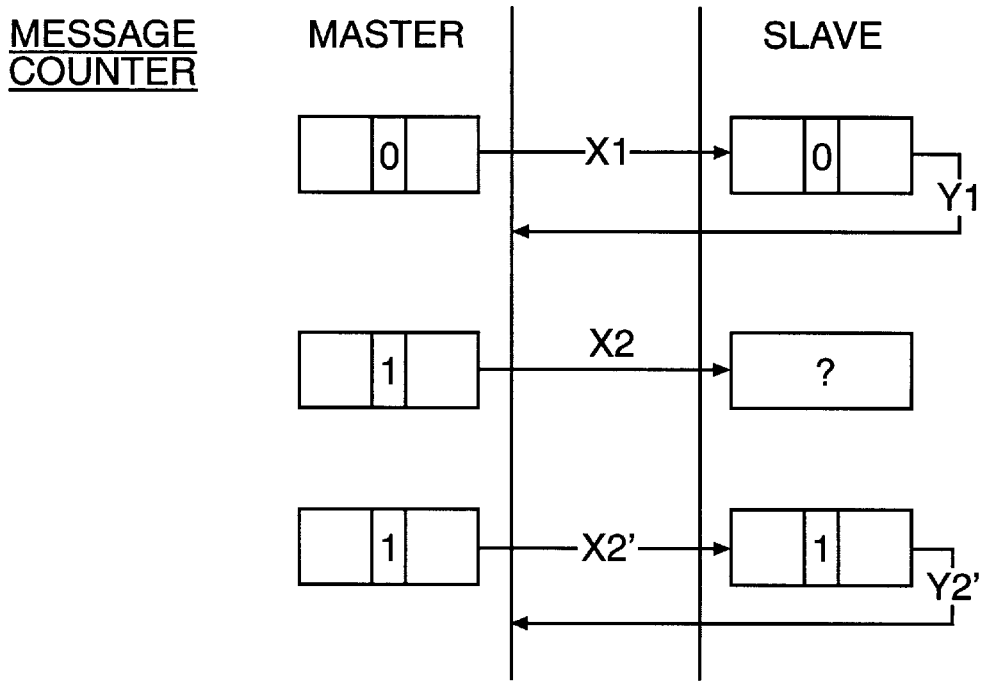
FIG. 7 shows an example of how a lost or erroneous byte sequence will be handled with a message counter according to the invention and with a retransmission flag according to the prior art.
Figure 7:
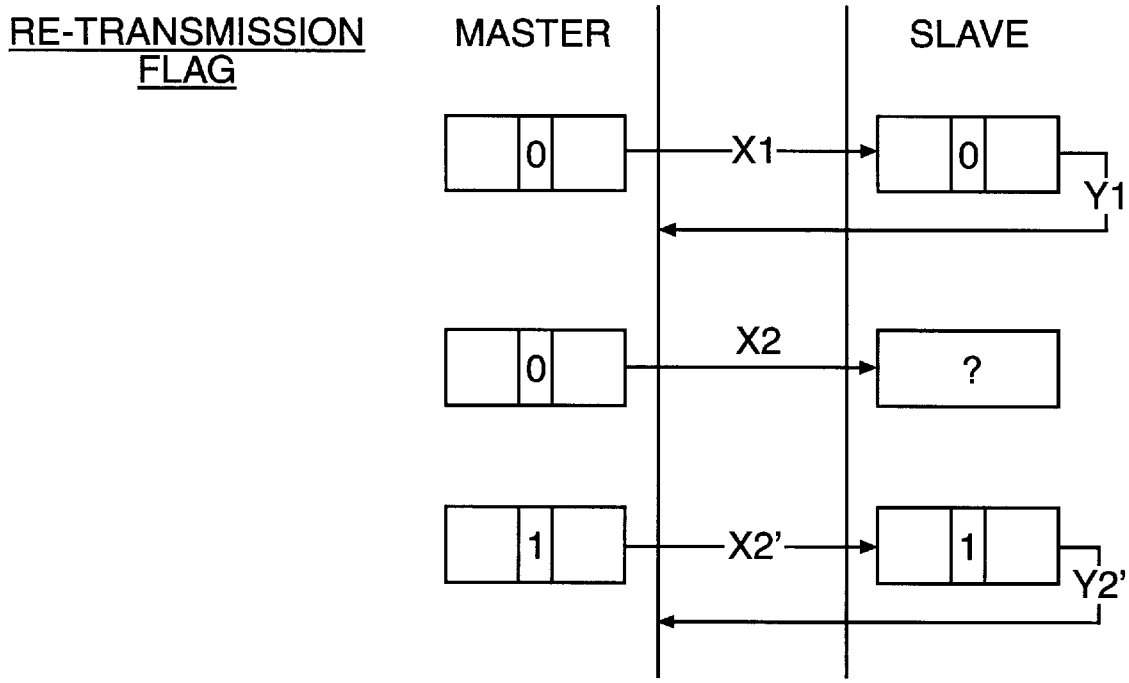

FIG. 7 shows an example of how a lost or erroneous byte sequence will be handled with a message counter according to the invention and with a retransmission flag according to the prior art. Without loss of generality, this example is provided by the transmission between a master unit and a slave unit, the communication comprising a command byte. In case of a message counter, and according to one aspect of the invention, the first command byte X1 transmitted from the master unit has its message counter set to "0". The command byte X1 is received correctly in the slave unit and returned as an acknowledge signal Y1. The master unit is ready to transmit a new command X2 with its message counter set to 1. If an acknowledge signal Y2 for this message is not received by the master unit, then the command X2 will be retransmitted. Note that the message counter is not changed because the communication is still processing message number 2 equal to a logic "1". The slave knows beforehand that it has to receive an altering bit, b3, for every new command to receive.

When using a retransmission flag, the communication may go wrong. The master unit transmits a command X1 with its retransmission flag set to "0". The slave unit receives X1 and transmits an acknowledge signal Y1, which is received in the master unit. The master is thereby ready to transmit a new command X2 with its retransmission flag set to "0". The command X2 is not acknowledged by the slave unit and the master unit will transmit a retransmission X2' of X2 with its retransmission flag set to "1". This retransmission is received and acknowledged correctly by the slave unit. If the command X1 is identical to X2', then the slave unit may—incorrectly—interpret the command X2' as a retransmission of X1 and thereby discard the command without storing or executing it.

Preferably a master unit may communicate with one of a number of slave units over a wire-less link, just as slave units may communicate with each other. Slave units may respond to interchangeable information or operate as dummy repeaters. This aspect of the present invention may be readily implemented by a person skilled in the art. However, a preferred way of providing these features is to expand the byte format with an address field, ADR:

| CMD | $\overline{\text{CMD}}$ | ADR | $\overline{\text{ADR}}$ | DATA$_1$ | $\overline{\text{DATA}}_1$ | ... | DATA$_N$ | $\overline{\text{DATA}}_N$ | CHK | $\overline{\text{CHK}}$ |
|---|---|---|---|---|---|---|---|---|---|---| where CMD is the command byte, DATA$_1$ to DATA$_N$ is the data bytes associated with the command byte and CHK is the check sum. N is the number of data bytes. Each slave unit is thereby associated with a unique address.

I claim:

1. A method of communication between a master unit and a slave unit comprising the steps of:
   sending a command byte from the master unit to the slave unit, said command byte comprising data byte counter bits interpretable by the slave unit according to the following rule set:
      if said data byte counter bits belong to a first set of commands, then said data byte counter bits contain information representing a number of associated data bytes which is an expected number of data bytes; and
      if said data byte counter bits belong to a second set of commands, then said data byte counter bits contains information representing a number which must be decoded before an expected number of data bytes is obtained;
   receiving the command byte;
   interpreting the command byte; and
   receiving the number of data bytes required by the rule set.

2. The method according to claim 1, further comprising the step of:
   increasing a message counter in said command byte each time a new message is sent, except when the message is retransmitted.

3. The method according to claim 2, wherein said step of increasing a message counter includes a step of increasing a single bit.

4. The method according to claim 1, wherein said step of sending a command byte includes the step of sending a command byte having 4 bits, of which 3 bits are data byte counter bits.

5. The method according to claim 1, wherein said step of sending a command byte having data byte counter bits belonging to the first set of commands comprises a step of sending one of 6 groups of commands, each group being respectively associated with 0, 1, 2, 3, 4, and 5 data bytes; and wherein said step of sending a command byte having data byte counter bits belonging to the second set of commands comprises a step of sending 2 groups of commands, each group being respectively associated with 0 and 1 data bytes.

6. The method according to claim 1, further comprising the steps of:
   sending an address byte for addressing a slave unit; and
   sending a complementary byte for each of the command, data, and address bytes.

7. The method according to claim 1, further comprising the steps of:
   sending a check sum succeeding said data bytes; and
   sending a complementary byte for each of the command, data, and check sum bytes.

8. The method according to claim 1, further comprising the step of:
   returning an acknowledge signal which is identical to he received signal.

9. A method of receiving information in a slave unit, comprising the steps of:
   receiving a command byte comprising data byte counter bits; and
   receiving data bytes interpretable according to the following rule set:
      if said data byte counter bits belong to a first set of commands, then said data byte counter bits contain information representing a number of associated data bytes which is an expected number of data bytes; and
      if said data byte counter bits belong to a second set of commands, then said data byte counter bits contain information representing a number which must be decoded before an expected number of data bytes is obtained.

10. The method according to claim 9, wherein said step of receiving a command byte comprises a step of receiving a message counter which remains unchanged during retransmissions.

11. The method according to claim 10, wherein said step of receiving a message counter includes a step of receiving a single bit.

12. The method according to claim 9, wherein the step of receiving a command byte includes a step of receiving 4 command bits of which 3 are data byte counter bits.

13. The method according to claim 9, wherein said step of receiving a command byte having data byte counter bits belonging to the first set of commands comprises a step of receiving one of 6 groups of commands, each group being respectively associated with 0, 1, 2, 3, 4, and 5 data bytes; and wherein said step of receiving a command byte having data byte counter bits belonging to the second set of commands comprises a step of sending 2 groups of commands, each group being respectively associated with 0 and 1 data bytes.

14. The method according to claim 9, further comprising the steps of:
   receiving an address byte and interpreting the associated command and data bytes if said address byte is accepted; and
   receiving a complementary byte for each of the command, data, and address bytes.

15. The method according to claim 9, further comprising the steps of:
   receiving a check sum succeeding said data bytes; and
   receiving a complementary byte for each of the command, data, and check sum bytes.

16. The method according to claim 9, further comprising the step of:
   returning an acknowledge signal which is identical to the received signal.

17. A method of sending information from a master unit, comprising the steps of:
   sending a command byte comprising command bits and data byte counter bits; and
   sending a number of data bytes interpretable according to the following rule set:
      if said data byte counter bits belong to a first set of commands, then said data byte counter bits contain information representing a number of associated data bytes which is the number of data bytes to be sent; and if said data byte counter bits belong to a second set of commands, then said data byte counter bits contain information representing a number which must be encoded before the number of data bytes to be sent is obtained.

18. The method according to claim 17, wherein said step of sending a command byte further comprises a step of sending a message counter which is increased each time a new message is sent, except when the message is retransmitted.

19. The method according to claim 18, wherein said step of increasing a message counter includes a step of increasing a single bit.

20. The method according to claim 17, wherein said step of sending a command byte includes sending a command byte having 4 bits, of which 3 bits are data byte counter bits.

21. The method according to claim 17, wherein said step of sending a command byte having data byte counter bits belonging to the first set of commands comprises a step of sending one of 6 groups of commands, each group being respectively associated with 0, 1, 2, 3, 4, and 5 data bytes; and wherein said step of sending a command byte having data byte counter bits belonging to the second set of commands comprises a step of sending 2 groups of commands, each group being respectively associated with 0 and 1 data bytes.

22. The method according to claim 17, further comprising the steps of:
sending an address byte for addressing a slave unit; and
sending a complementary byte for each of the command, data, and address bytes.

23. The method according to claim 17, further comprising the steps of:
sending a check sum succeeding said data bytes; and
sending a complementary byte for each of the command, data, and check sum bytes.

24. A computer readable medium encoded with a program for transferring information between a master program and a slave program, the information comprising a command byte associated with a number of data bytes, the master program comprising a counter having a data structure with one parameter containing information on the number of associated data bytes, said parameter is modifiable according to the following rule set:
if said command byte belongs to a first set of commands, then the command byte contains a value representing the number of associated data bytes and said parameter is modified with that value; and
if said command byte belongs to a second set of commands, then said parameter is modified with a reduced value.

25. A computer readable medium encoded with a slave program for receiving information, the information comprising a command byte associated with a number of data bytes, the slave program comprising a counter having a data structure with one parameter containing information on the number of associated data bytes, wherein said slave program modifies said parameter according to the following rule set:
if said command byte belongs to a first set of commands, then the command byte contains a value representing the number of associated data bytes and said parameter is modified with that value; and
if said command byte belongs to a second set of commands, then said parameter is modified with a reduced value.

26. A computer readable medium encoded with a master program for transmitting information, the information comprising a command byte associated with a number of data bytes, the master program comprising a data structure with one parameter containing information on the number of associated data bytes to be transmitted, said parameter being modified according to the following rule set:
if said command byte belongs to a first set of commands, then the command byte contains a first value representing the number of associated data bytes and said parameter is modified with that value; and
if said command byte belongs to a second set of commands, then said parameter is modified with a value which is different from said first value.

27. A computer system for communication between a master unit and a slave unit comprising:
means for sending a command byte from the master unit to the slave unit comprising data byte counter bits interpretable by the slave unit according to the following rule set:
if said data byte counter bits belong to a first set, then said data byte counter bits contain information representing a number of associated data bytes which is an expected number of data bytes; and
if said data byte counter bits belong to a second set, then said data byte counter bits contain information representing a number which must be decoded before an expected number of data bytes is obtained;
means for receiving the command byte;
means for interpreting the command byte; and
means for receiving the number of data bytes required by the rule set.

28. A computer system for receiving information in a slave unit, comprising:
means for receiving a command byte comprising data byte counter bits; and
means for receiving data bytes according to the following rule set:
if said data byte counter bits belong to a first set, then said data byte counter bits contain information representing a number of associated data bytes which is an expected number of data bytes; and
if said data byte counter bits belong to a second set, then said data byte counter bits contain information representing a number which must be decoded before an expected number of data bytes is obtained.

29. A computer system for sending information from a master unit, comprising:
means for sending a command byte comprising command bits and data byte counter bits; and
means for sending a number of data bytes, according to the following rule set:
if said data byte counter bits belong to a first set, then said data byte counter bits contain information representing a number of associated data bytes which is the number of data bytes to be sent; and
if said data byte counter bits belong to a second set, then said data byte counter bits contain information representing a number which must be encoded before the number of data bytes to be sent is obtained.

30. A computer readable medium encoded with a program for performing a method of communication between a master unit and a slave unit, said method comprising the steps of:
sending a command byte from the master unit to the slave unit comprising data byte counter bits interpretable by the slave unit according to the following rule set:

if said data byte counter bits belong to a first set of commands, then said data byte counter bits contain information representing a number of associated data bytes which is an expected number of data bytes; and if said data byte counter bits belong to a second set of commands, then said data byte counter bits contains information representing a number which must be decoded before an expected number of data bytes is obtained;

receiving the command byte;

interpreting the command byte; and receiving the number of data bytes required by the rule set.

31. The medium according to claim 30, wherein said method further includes the step of:

increasing a message counter in said command byte each time a new message is sent, except when the message is retransmitted.

32. The medium according to claim 31, wherein said step of increasing a message counter includes a step of increasing a single bit.

33. The medium according to claim 30, wherein said step of sending a command byte includes sending a command byte having 4 bits, of which 3 bits are data byte counter bits.

34. The medium according to claim 30, wherein said step of sending a command byte having data byte counter bits belonging to the first set of commands includes a step of sending one of 6 groups of commands, each group being respectively associated with 0, 1, 2, 3, 4, and 5 data bytes; and wherein said step of sending a command byte having data byte counter bits belonging to the second set of commands comprises a step of sending 2 groups of commands, each group being respectively associated with 0 and 1 data bytes.

35. The medium according to claim 30, wherein the method further comprises the steps of:

sending an address byte for addressing a slave unit; and sending a complementary byte for each of the command, data, and address bytes.

36. The medium according to claim 30, wherein the method further comprises the steps of:

sending a check sum succeeding said data bytes; and sending a complementary byte for each of the command, data, and check sum bytes.

37. The medium according to claim 30, wherein the method further comprises the step of:

returning an acknowledge signal which is identical to the received signal.

38. A computer readable medium encoded with a program for performing a method of receiving information in a slave unit, said method comprising the steps of:

receiving a command byte comprising data byte counter bits;

receiving data bytes, according to the following rule set:

if said data byte counter bits belong to a first set of commands, then said data byte counter bits contain information representing a number of associated data bytes which is an expected number of data bytes; and if said data byte counter bits belong to a second set of commands, then said data byte counter bits contain information representing a number which must be decoded before an expected number of data bytes is obtained.

39. The medium according to claim 38, wherein said step of receiving a command byte comprises a step of receiving a message counter which remains unchanged during retransmissions.

40. The medium according to claim 39, wherein said step of receiving a message counter includes a step of receiving a single bit.

41. The medium according to claim 38, wherein the step of receiving a command byte includes a step of receiving 4 command bits, of which 3 are data byte counter bits.

42. The medium according to claim 38, wherein said step of receiving a command byte having data byte counter bits belonging to the first set of commands comprises a step of receiving one of 6 groups of commands, each group being respectively associated with 0, 1, 2, 3, 4, and 5 data bytes; and wherein said said step of receiving a command byte having data byte counter bits belonging to the second set of commands comprises a step of sending 2 groups of commands, each group being respectively associated with 0 and 1 data bytes.

43. The medium according to claim 38, wherein the method further comprises the steps of:

receiving an address byte and interpreting the associated command and data bytes if said address byte is accepted; and receiving a complementary byte for each of the command, data, and address bytes.

44. The medium according to claim 38, wherein the medium further comprises the steps of:

receiving a check sum succeeding said data bytes; and receiving a complementary byte for each of the command, data, and check sum bytes.

45. The medium according to claim 38, wherein the method further comprises the step of:

returning an acknowledge signal which is identical to the received signal.

46. A computer readable medium comprising a program for performing a method of sending information from a master unit, said method comprising the steps of:

sending a command byte comprising command bits and data byte counter bits; and sending a number of data bytes, according to the following rule set:

if said data byte counter bits belong to a first set of commands, then said data byte counter bits contain information representing a number of associated data bytes which is the number of data bytes to be sent; and if said data byte counter bits belong to a second set of commands, then said data byte counter bits contain information representing a number which must be encoded before the number of data bytes to be sent is obtained.

47. The medium according to claim 46, wherein said step of sending a command byte further comprises a step of sending a message counter which is increased each time a new message is sent, except when the message is retransmitted.

48. The medium according to claim 47, wherein said step of increasing a message counter includes a step of increasing a single bit.

49. The medium according to claim 46, wherein said step of sending a command byte includes sending a command byte having 4 bits, of which 3 bits data byte counter bits.

50. The medium according to claim 46, wherein said step of sending a command byte having data byte counter bits belonging to the first set of commands comprises a step of receiving one of 6 groups of commands, each group being respectively associated with 0, 1, 2, 3, 4, and 5 data bytes; and wherein said said step of sending a command byte having data byte counter bits belonging to the second set of commands comprises a step of sending 2 groups of commands, each group being respectively associated with 0 and 1 data bytes.

51. The medium according to claim 46, wherein the method further comprises the steps of:

sending an address byte for addressing a slave unit; and sending a complementary byte for each of the command, data, and address bytes.

52. The medium according to claim 46, wherein the method further comprises the steps of:

sending a check sum succeeding said data bytes; and sending a complementary byte for each of the command, data, and check sum bytes.

53. A computer readable medium encoded with a program for communicating information between a master unit and a slave unit, said program comprising:

means for sending a command byte from the master unit to the slave unit comprising data byte counter bits interpretable by the slave unit according to the following rule set:

if said data byte counter bits belong to a first set, then said data byte counter bits contain information representing a number of associated data bytes which is an expected number of data bytes; and if said data byte counter bits belong to a second set, then said data byte counter bits contain information representing a number which must be decoded before an expected number of data bytes is obtained;

means for receiving the command byte;

means for interpreting the command byte; and means for receiving the number of data bytes required by the rule set.

54. A computer readable medium encoded with a program for receiving information in a slave unit, said program comprising:

means for receiving a command byte comprising data byte counter bits;

means for receiving data bytes according to the following rule set:

if said data byte counter bits belong to a first set, then said data byte counter bits contain information representing a number of associated data bytes which is an expected number of data bytes; and if said data byte counter bits belong to a second set, then said data byte counter bits contain information representing a number which must be decoded before an expected number of data bytes is obtained.

55. A computer readable medium encoded with a program for sending information from a master unit, said program comprising:

means for sending a command byte comprising command bits and data byte counter bits;

means for sending a number of data bytes, according to the following rule set:

if said data byte counter bits belong to a first set, then said data byte counter bits contain information representing a number of associated data bytes which is the number of data bytes to be sent; and if said data byte counter bits belong to a second set, then said data byte counter bits contain information representing a number which must be encoded before the number of data bytes to be sent is obtained.

\* \* \* \* \*